US012668207B2

(12) United States Patent

Salter et al.

(10) Patent No.: US 12,668,207 B2

(45) Date of Patent: Jun. 30, 2026

(54) SYSTEMS AND METHODS FOR PREDATORY TOWING PREVENTION AND NOTIFICATION

(71) Applicant: Ford Global Technologies, LLC, Dearborn, MI (US)

(72) Inventors: Stuart C. Salter, White Lake, MI (US); Kendra White, Ann Arbor, MI (US); Ryan O'Gorman, Beverly Hills, MI (US); Brendan Diamond, Naples, FL (US); Keith Weston, Canton, MI (US)

( * ) Notice: Subject to any disclaimer, the term of this patent is extended or adjusted under 35 U.S.C. 154(b) by 33 days.

(21) Appl. No.: 18/815,226

(22) Filed: Aug. 26, 2024

(65) Prior Publication Data

US 2026/0054689 A1 Feb. 26, 2026

(51) Int. Cl.
| | |
|---|---|
| *B60R 25/102* | (2013.01) |
| *B60R 25/32* | (2013.01) |
| *G06Q 50/40* | (2024.01) |
| *G06V 20/58* | (2022.01) |

(52) U.S. Cl.
CPC ............ *B60R 25/102* (2013.01); *B60R 25/32* (2013.01); *G06Q 50/40* (2024.01); *G06V 20/586* (2022.01)

(58) Field of Classification Search
None
See application file for complete search history.

(56) References Cited

U.S. PATENT DOCUMENTS

| | | | | |
|---|---|---|---|---|
| 9,812,015 | B1 * | 11/2017 | Cox | ....................... G08G 1/147 |
| 10,395,535 | B2 | 8/2019 | Wang | |

| | | | | |
|---|---|---|---|---|
| 2002/0065703 | A1 | 5/2002 | Garg | |
| 2006/0214779 | A1 * | 9/2006 | Harumoto | ............... B60R 25/04 |
| | | | | 340/426.11 |
| 2009/0179746 | A1 * | 7/2009 | Hsiang | .................. B60R 25/102 |
| | | | | 340/426.1 |
| 2010/0123565 | A1 | 5/2010 | Kaufman et al. | |
| 2015/0186991 | A1 | 7/2015 | Meyer et al. | |
| 2017/0053250 | A1 | 2/2017 | Bowers | |

(Continued)

FOREIGN PATENT DOCUMENTS

| | | | | |
|---|---|---|---|---|
| KR | 20200046987 A | * | 5/2020 | ............. B60N 2/002 |

OTHER PUBLICATIONS

HAAS Alert, Safety Cloud® for Towing, https://www.haasalert.com/safety-cloud-for-towing, 2024, pp. 1-6.

*Primary Examiner* — Fekadeselassie Girma

(74) *Attorney, Agent, or Firm* — Fank Lollo; Eversheds Sutherland (US) LLP

(57) ABSTRACT

A vehicle that can assist with preventing predatory towing is provided. The vehicle includes one or more sensors that can capture audio-visual and other data related to a location at which the vehicle may be parked. Based on the captured data, the vehicle can determine if that location has any specific parking rules and whether the vehicle is subject to towing. If the vehicle detects that it is being towed, it can verify based on the captured data whether the towing is legal or illegal. If the vehicle determines that the towing is illegal, it can output a notification to the tow operator that the towing activity is illegal. Additionally, the vehicle can capture data as the vehicle is being towed. This data along with the data captured by the vehicle prior to parking or just after parking can then be sent to the proper authorities.

20 Claims, 7 Drawing Sheets

(56)                    References Cited

U.S. PATENT DOCUMENTS

| | | | | |
|---|---|---|---|---|
| 2023/0034103 A1* | 2/2023 | Sasaki | .................. | B60T 13/662 |
| 2023/0182681 A1* | 6/2023 | Ando | .................. | B60T 13/662 |
| | | | | 701/70 |
| 2023/0191907 A1* | 6/2023 | Homma | ................ | B60K 28/04 |
| | | | | 701/70 |
| 2023/0339558 A1* | 10/2023 | King | .................... | B62D 59/04 |

* cited by examiner

100

350

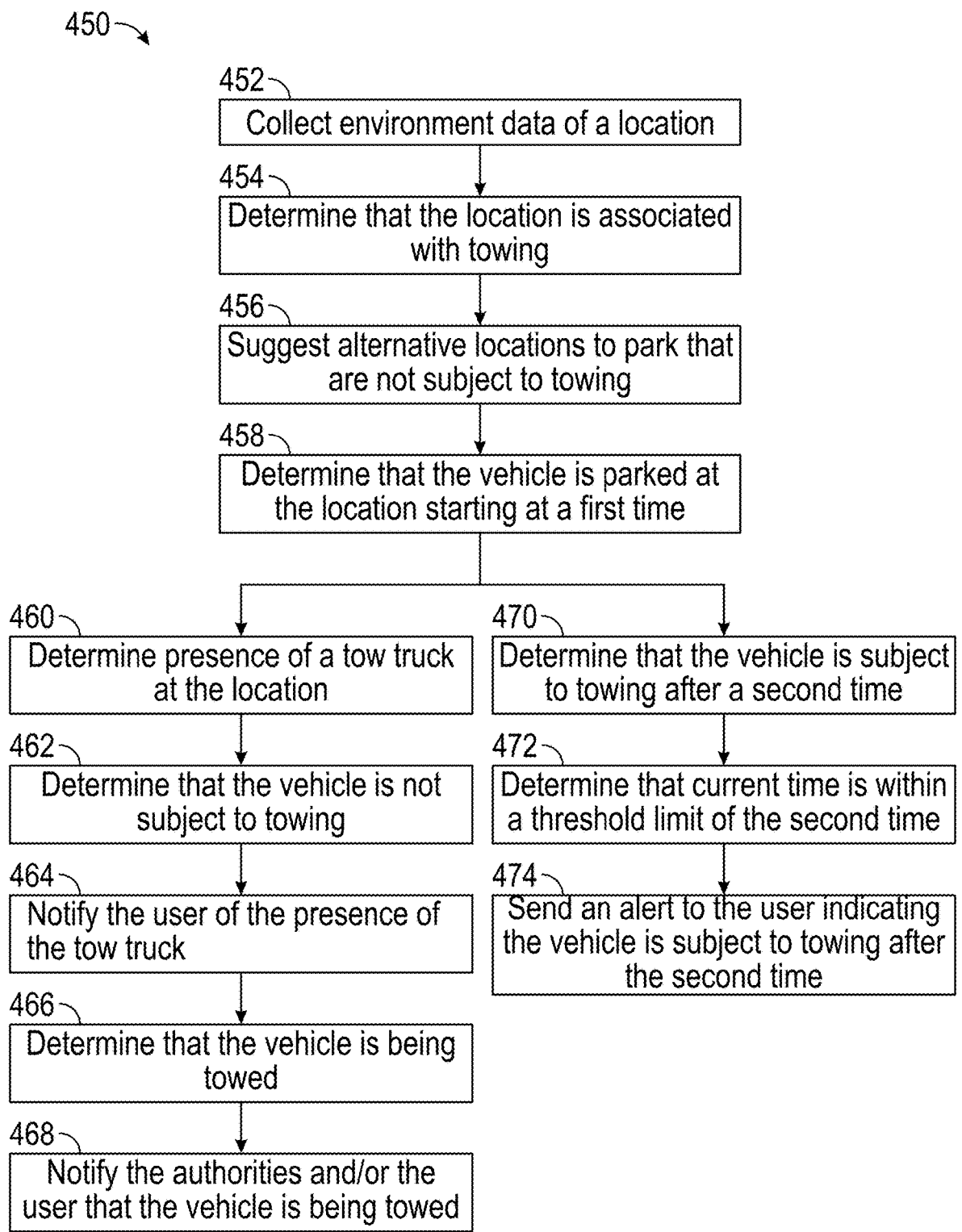

450

452
Collect environment data of a location

454
Determine that the location is associated with towing

456
Suggest alternative locations to park that are not subject to towing

458
Determine that the vehicle is parked at the location starting at a first time 460
Determine presence of a tow truck at the location 462
Determine that the vehicle is not subject to towing 464
Notify the user of the presence of the tow truck 466
Determine that the vehicle is being towed 468
Notify the authorities and/or the user that the vehicle is being towed 470
Determine that the vehicle is subject to towing after a second time 472
Determine that current time is within a threshold limit of the second time 474
Send an alert to the user indicating the vehicle is subject to towing after the second time

FIG. 6

SYSTEMS AND METHODS FOR PREDATORY TOWING PREVENTION AND NOTIFICATION

FIELD

The present disclosure relates to the field of vehicle communication. More specifically, embodiments of the present disclosure related to prevention of and notification related to predatory towing.

BACKGROUND

Predatory towing is a term that refers to unethical practices employed by some tow truck operators. In some cases, these practices can result in unfair and excessive charges for the vehicle owner. For example, vehicles parked legally at a location may be towed away without any warning to the vehicle user. Another example of predatory towing is when a tow truck appears at an accident site without being called and offers to tow the disabled vehicle. Thereafter, the tow truck operator may charge unreasonable fees and the driver of the disabled vehicle may be liable for those charges since he/she gave consent to the towing.

Predatory towing can result in significant costs to consumers. These costs can vary widely depending on the specific circumstances, but they can be substantial.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

FIG. 6 is a flow chart of another process performed by a vehicle according to an embodiment of the present disclosure.

DETAILED DESCRIPTION

Overview

The present disclosure describes systems and methods for preventing predatory and/or unauthorized towing of vehicles.

In some instances, a vehicle is provided that includes one or more processors, one or more sensors that are coupled to the one or more processors, a first memory coupled to the one or more processors, and a second memory coupled to the one or more processors. The vehicle captures environment data associated with an environment in the vicinity of the vehicle using the one or more sensors. The vehicle may also determine a first location of the vehicle within the environment and determine, based on the environment data, that the first location is associated with one or more parking rules. Further, the vehicle may determine that the vehicle is being towed and thereafter the vehicle may determine that towing of the vehicle is not authorized based on the one or more parking rules. The vehicle may also output a notification indicating that the towing of the vehicle is not authorized.

In another instance, a method for preventing predatory towing is provided. The method may include a vehicle capturing first data associated with a first location of the vehicle a plurality of integrated sensors at a first time. The method may further include the vehicle determining that the first location is associated with one or more parking rules based on the first data. The method may further include determining that the vehicle is being towed at a second time. Thereafter the method may include the vehicle determining that the towing is unauthorized based on the one or more parking rules. Thereafter, the method may further include the vehicle capturing second data associated with the towing, outputting a notification indicative of the towing being unauthorized, and sending the second data to a user device of a user of the vehicle or an external server associated with a law enforcement agency.

In yet another instance, a vehicle is provided that captures first data associated with a first location of the vehicle at a first time. The first data includes information about one or more road signs at the first location. The vehicle may also determine that the first location is associated with one or more parking rules based on the first data and determine that the vehicle is parked at the first location. Thereafter, the vehicle may at a second time, determine presence of a tow vehicle in the vicinity of the first location and send a message indicating presence of the tow vehicle to a user device associated with a user of the vehicle.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

Figure 1:
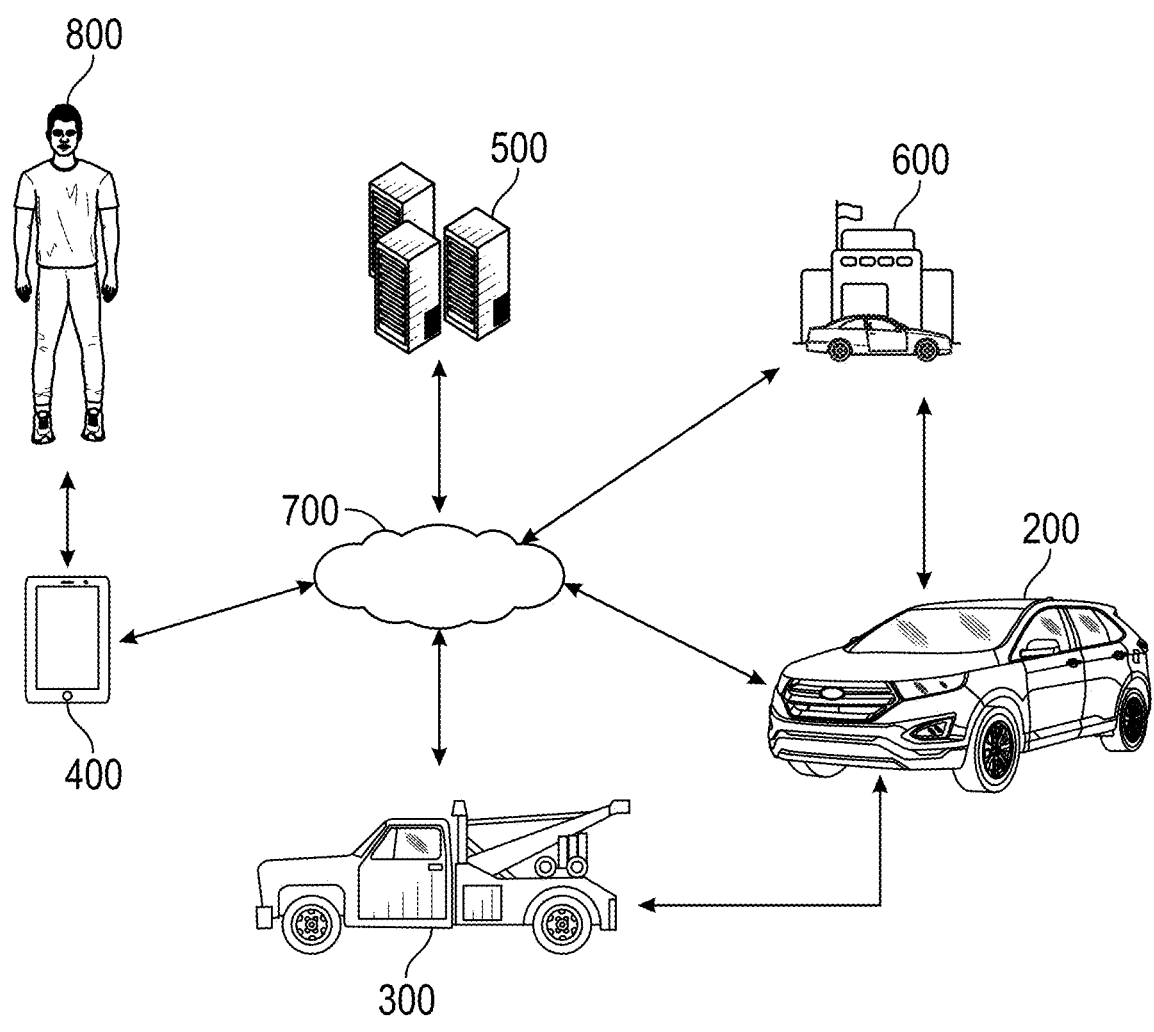
FIG. 1 illustrates an environment in which the embodiments of the present disclosure may be implemented.

FIG. 1 illustrates an environment 100 in which the various embodiments of the present invention may be implemented. The environment 100 may include a vehicle 200, a tow vehicle 300, a user device 400, one or more control servers 500, and an authorities' server 600. The control servers 500, the vehicle 200, the authorities' server 600, the user device 400, and the tow vehicle 300 may be communicatively coupled to each other via one or more networks 700. The user device 400 may be associated with a user 800 of the vehicle 200, and may be, for example, a mobile phone, a laptop, a computer, a tablet, a smartwatch, a wearable device, or any other device with communication capabilities.

The control server 500 may be part of a cloud-based computing infrastructure and may be associated with and/or include a Telematics Service Delivery Network (SDN) that provides digital data services to the vehicle 200. In additional aspects, the control server 500 may be an assistance server, and may be associated with at least one of a tow assistance firm, a vehicle maintenance and repair firm, an insurance firm, and a transportation firm. Details of the control server 500 are provided below with reference to FIG. 7. In an embodiment, the authorities' server 600 may be associated with the authorities such as the police, Fire department, paramedics, or other law enforcement entities. In some embodiments, the authorities' server 600 may be similar in construction to the control server 500.

The network 700 illustrates an example communication infrastructure in which the connected devices discussed in various embodiments of this disclosure may communicate. The network 700 may be and/or include the Internet, a private network, public network or other configuration that operates using any one or more known communication protocols such as, for example, transmission control protocol/Internet protocol (TCP/IP), Bluetooth®, Bluetooth® low Energy (BLE), Wi-Fi based on the Institute of Electrical and Electronics Engineers (IEEE) standard 802.11, ultrawideband (UWB), and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples.

Multiple scenarios may occur in the environment 100. In one embodiment, if the vehicle 200 experiences a breakdown and needs to be towed, the vehicle 200 may send a message to the control server 500 requesting a tow. The control server may then send a message to the company operating the tow vehicle 300 instructing the company to tow the vehicle 200. In addition, the control server 500 may also send a message to the vehicle 200 (and/or the user device 400) providing details of the towing company (e.g., name, address, etc.), the tow vehicle 300 (e.g., license plate number, etc.), and the driver of the tow vehicle (e.g., name, driver's license number, etc.). After the tow vehicle 300 arrives at the location of the vehicle 200, the vehicle 200 may determine information about the tow vehicle, (e.g., using one or more of the vehicle 200 sensors). In one instance, the vehicle may capture the license plate image of the tow vehicle 300 and compare that with the information received from the control server 500. If the information matches, the vehicle 200 may determine that the tow vehicle 300 is authorized to tow the vehicle 200. If the information does not match, the vehicle 200 may alert the tow vehicle 300 operator (and the user 800 via the user device 400) that they are not authorized to tow the vehicle 200. In one embodiment, the vehicle 200 may notify the operator of the tow vehicle 300 that his/her actions are being recorded as proof of unauthorized towing.

The vehicle 200 may include a plurality of units including, but not limited to, an automotive computer, a Vehicle Control Unit (VCU), and a detection unit. Details of the vehicle are provided below in reference to FIG. 2.

Figure 2:
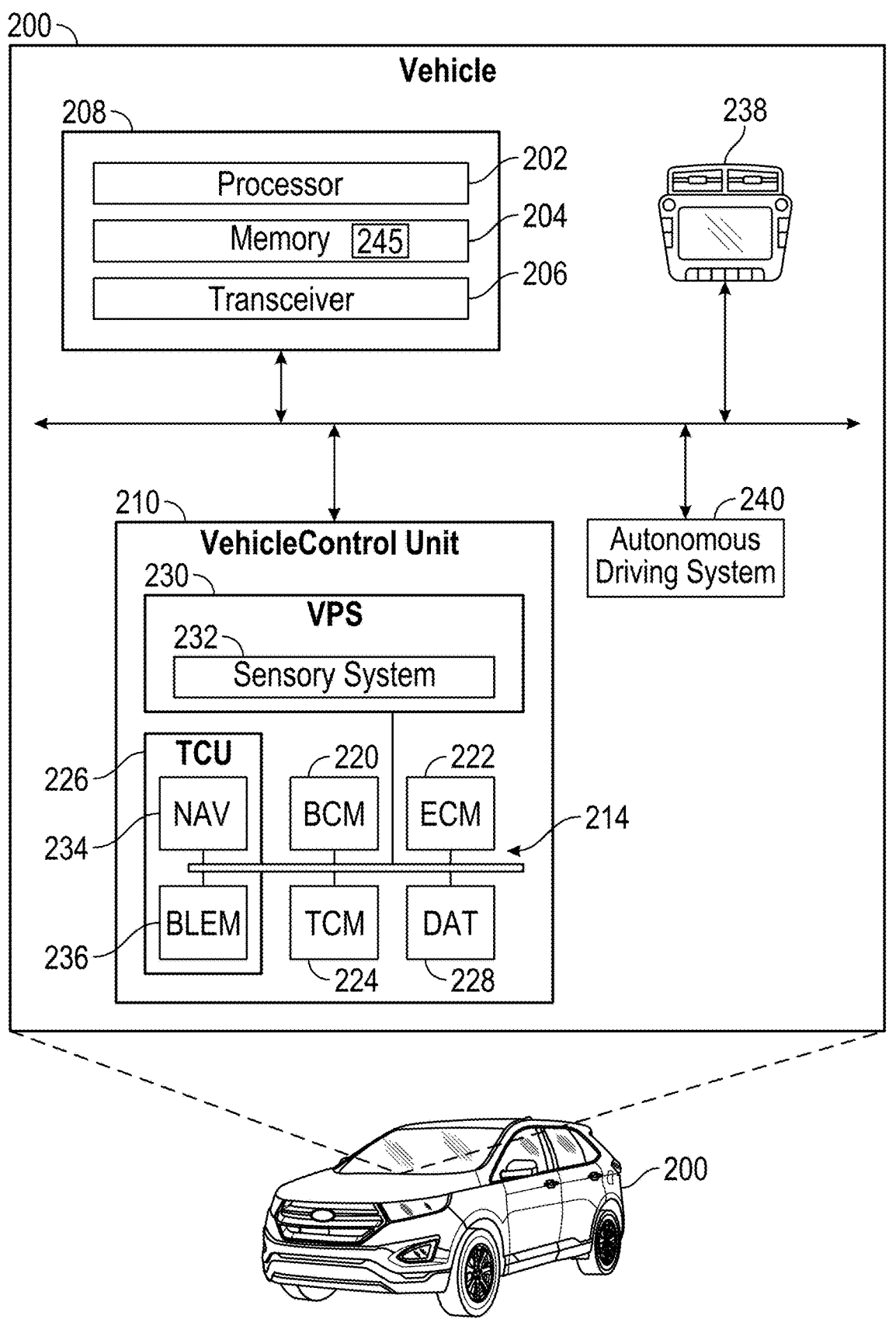
FIG. 2 illustrates a block diagram of a vehicle according to an embodiment of the present disclosure.

FIG. 2 illustrates a block diagram of a vehicle 200 in which embodiment of the present disclosure can be implemented. The vehicle 200 may include a plurality of units including, but not limited to, an automotive computer 208, a Vehicle Control Unit (VCU) 210, and an infotainment unit 238. The VCU 210 may include a plurality of Electronic Control Units (ECUs) 214 disposed in communication with the automotive computer 208.

In some embodiments, a user device, such as a mobile phone, a laptop computer, or the like may be configured to connect with the automotive computer 208, which may communicate via one or more wireless connection(s), and/or may connect with the vehicle 200 directly by using near field communication (NFC) protocols, Bluetooth® protocols, Wi- Fi, Ultra-Wide Band (UWB), and other possible data connection and sharing techniques.

The automotive computer 208 may be installed anywhere in the vehicle 200, in accordance with the disclosure. The automotive computer 208 may be or include an electronic vehicle controller, having one or more processor(s) 202, one more memories 204, and one or more transceivers 206.

The processor(s) 202 may be disposed in communication with one or more memory devices disposed in communication with the respective computing systems (e.g., the memory 204 and/or one or more external databases not shown in FIG. 2). The processor(s) 202 may utilize the memory 204 to store programs in code and/or to store data for performing operations in accordance with the disclosure. The memory 204 may be a non-transitory computer-readable storage medium or memory storing a vehicle control program code. The memory 204 may include any one or a combination of volatile memory elements (e.g., dynamic random-access memory (DRAM), synchronous dynamic random-access memory (SDRAM), etc.) and may include any one or more nonvolatile memory elements (e.g., erasable programmable read-only memory (EPROM), flash memory, electronically erasable programmable read-only memory (EEPROM), programmable read-only memory (PROM), etc.). In some embodiments, memory 204 may include a module 245 that can implement the various embodiments of the present disclosure. Module 245 may include instructions that can be executed by the processor 202 to realize the various embodiments of the present disclosure.

Automotive computer 208 may also include a transceiver 206. The transceiver 206 may be configured to receive information/inputs from one or more external devices or systems, (e.g., a user device 208, an external server, and/or the like). Further, the transceiver 206 may transmit notifications, requests, signals, etc. to the external devices or systems. In addition, the transceiver 206 may be configured to receive information/inputs from vehicle components such as the vehicle sensory system 232, one or more ECUs 214, and/or the like. Further, the transceiver 206 may transmit signals (e.g., command signals) or notifications to the vehicle components such as the BCM 220, the infotainment system 238, and/or the like.

In some embodiments, the VCU 210 may share a power bus with the automotive computer 208 and may be configured and/or programmed to coordinate the data between vehicle systems, connected servers and/or the like. The VCU 210 may include or communicate with any combination of the ECUs 214, such as, for example, a Body Control Module (BCM) 220, an Engine Control Module (ECM) 222, a Transmission Control Module (TCM) 224, a Telematics Control Unit (TCU) 226, a Driver Assistances Technologies (DAT) controller 228, etc. The VCU 210 may further include and/or communicate with a Vehicle Perception System (VPS) 230, having connectivity with and/or control of one or more vehicle sensory system(s) 232. The vehicle sensory system 232 may include one or more vehicle sensors including, but not limited to, a Radio Detection and Ranging (RADAR or "radar") sensor configured for detection and localization of objects inside and outside the vehicle 200 using radio waves, sitting area buckle sensors, sitting area sensors, a Light Detecting and Ranging ("LIDAR") sensor, door sensors, proximity sensors, temperature sensors, wheel sensors, one or more ambient weather or temperature sensors, vehicle interior and exterior cameras, steering wheel sensors, etc. The sensors that are part of the vehicle sensory system 232 may be coupled to the vehicle 200 at one or more locations and in one or more manner. For example, the various sensors of the vehicle sensory system 232 may be integrated into the various subsystems of the vehicle 200, such as doors, mirrors, roof, etc. or attached to the vehicle 200 using an appropriate mounting mechanism. In some embodiments, the various sensors of the vehicle sensory system 232 may be located at the front, back, sides, top, bottom, and underneath the vehicle 200. The location of a sensor may depend on its function. For example, a sensor that monitors the area underneath the vehicle may be connected to a bottom surface of the vehicle 200 while a sensor that can monitor an area to either side of the vehicle 200 may be mounted or integrated into the doors of the vehicle 200. Vehicle sensory system 232 may also include one or more road noise sensors such as accelerometers that are coupled to various mechanical components and/or systems of the vehicle 200. One skilled in the art will realize that the sensors may be coupled to the vehicles in various different ways and locations other than the ones mentioned above.

In some embodiments, the VCU 210 may control vehicle operational aspects and implement one or more instruction sets received from the server 206, the user device 208, or from one or more instruction sets stored in the memory 204.

The TCU 226 may be configured and/or programmed to provide vehicle connectivity to wireless computing systems onboard and off board the vehicle 200, and may include a Navigation (NAV) receiver 234 for receiving and processing a GPS signal, a BLE® Module (BLEM) 236, a Wi-Fi transceiver, a UWB transceiver, and/or other wireless transceivers (not shown in FIG. 2) that may be configurable for wireless communication (including cellular communication) between the vehicle 200 and other systems (e.g., a vehicle key fob (not shown in FIG. 2), an external server, a user device, etc.), computers, and modules. The TCU 226 may be in communication with the ECUs 214 by way of a bus. In some aspects, the TCU 226 may be configured to determine a real-time vehicle geolocation, e.g., via the NAV receiver 234.

The ECUs 214 may control aspects of vehicle operation and communication using inputs from human drivers, inputs from the automotive computer 208, and/or via wireless signal inputs received via the wireless connection(s) from other connected devices, such as the server 206, among others.

The BCM 220 generally includes integration of sensors, vehicle performance indicators, and variable reactors associated with vehicle systems, and may include processor-based power distribution circuitry that may control functions associated with the vehicle body such as lights, windows, security, camera(s), audio system(s), speakers, wipers, door locks and access control, various comfort controls, etc. The BCM 220 may also operate as a gateway for bus and network interfaces to interact with remote ECUs (not shown in FIG. 2).

The DAT controller 228 may provide Level-1 through Level-3 automated driving and driver assistance functionality that may include, for example, active parking assistance, vehicle backup assistance, and/or adaptive cruise control, among other features. The DAT controller 228 may also provide aspects of user and environmental inputs usable for user authentication.

In some embodiments, the automotive computer 208 may connect with an infotainment system 238 (or a vehicle Human-Machine Interface (HMI)). The infotainment system 238 may include a touchscreen interface portion, and may include voice recognition features, biometric identification capabilities that may identify users based on facial recognition, voice recognition, fingerprint identification, or other biological identification means. In other aspects, the infotainment system 238 may be further configured to receive user instructions via the touchscreen interface portion, and/or or output or display notifications, navigation maps, etc. on the touchscreen interface portion.

The computing system architecture of the automotive computer 208 and/or the VCU 210 may omit certain computing modules. It should be readily understood that the computing environment depicted in FIG. 2 is an example of a possible implementation according to the present disclosure, and thus, it should not be considered as limiting or exclusive.

In some embodiments, vehicle 200 may include an autonomous driving system 240. Vehicle 200 may be manually driven or configured to operate, using the autonomous driving system 240, in a fully autonomous (e.g., driverless) mode (e.g., Level-5 autonomy) or in one or more partial autonomous modes which may include driver assist technologies. Examples of partial autonomous (or driver assist) modes are widely understood in the art as autonomy Levels 1 through 4. For example, a vehicle having Level-1 autonomy may include a single automated driver assistance feature, such as steering or acceleration assistance. Adaptive cruise control is one such example of a Level-1 autonomous system that includes aspects of both acceleration and steering.

Level-2 autonomy in vehicles may provide driver assist technologies such as partial automation of steering and acceleration functionality, where the automated system(s) are supervised by a human driver who performs non-automated operations such as braking and other controls. In some embodiments, with Level-2 autonomous features and greater, a primary user may control the vehicle while the user is inside of the vehicle, or in some example embodiments, from a location remote from the vehicle but within a control zone extending up to several meters from the vehicle while it is in remote operation.

Level-3 autonomy in a vehicle can provide conditional automation and control of driving features. For example, Level-3 vehicle autonomy may include "environmental detection" capabilities, where the autonomous vehicle (AV) can make informed decisions independently from a present driver, such as accelerating past a slow-moving vehicle, while the present driver remains ready to retake control of the vehicle if the system is unable to execute the task.

Level-4 AVs can operate independently from a human driver, but may still include human controls for override operation. Level-4 automation may also enable a self-driving mode to intervene responsive to a predefined conditional trigger, such as a road hazard or a system event.

Level-5 AVs may include fully autonomous vehicle systems that require no human input for operation and may not include human operational driving controls.

Figure 3A:
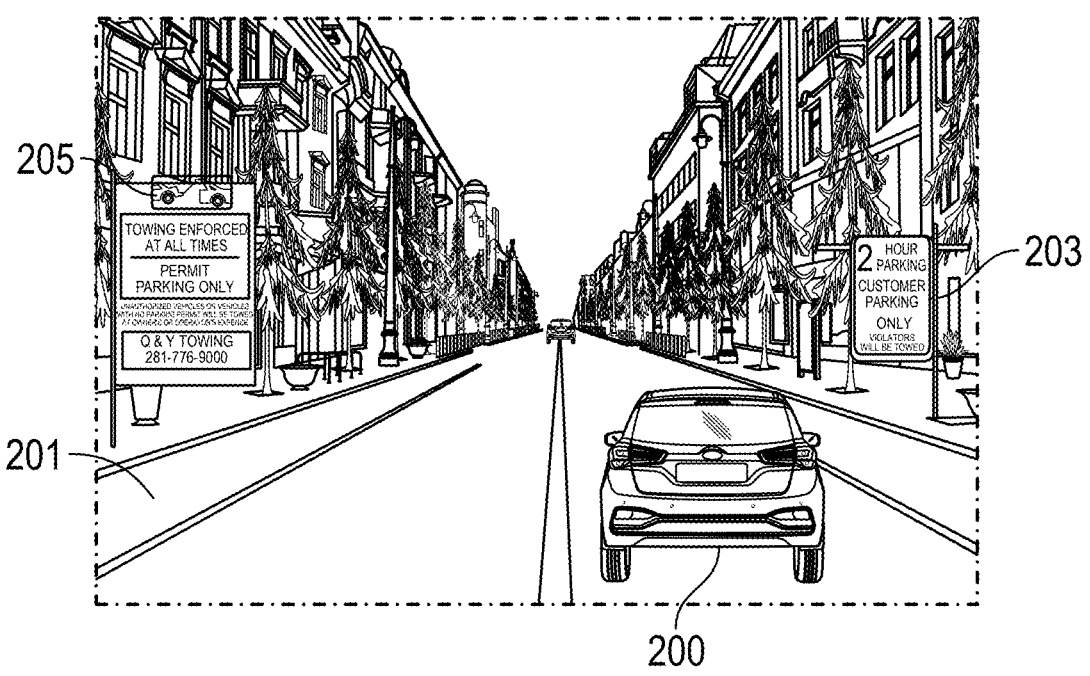
FIGS. 3A and 3B illustrate environments in which embodiments of the present disclosure can be implemented.
Figure 3B:
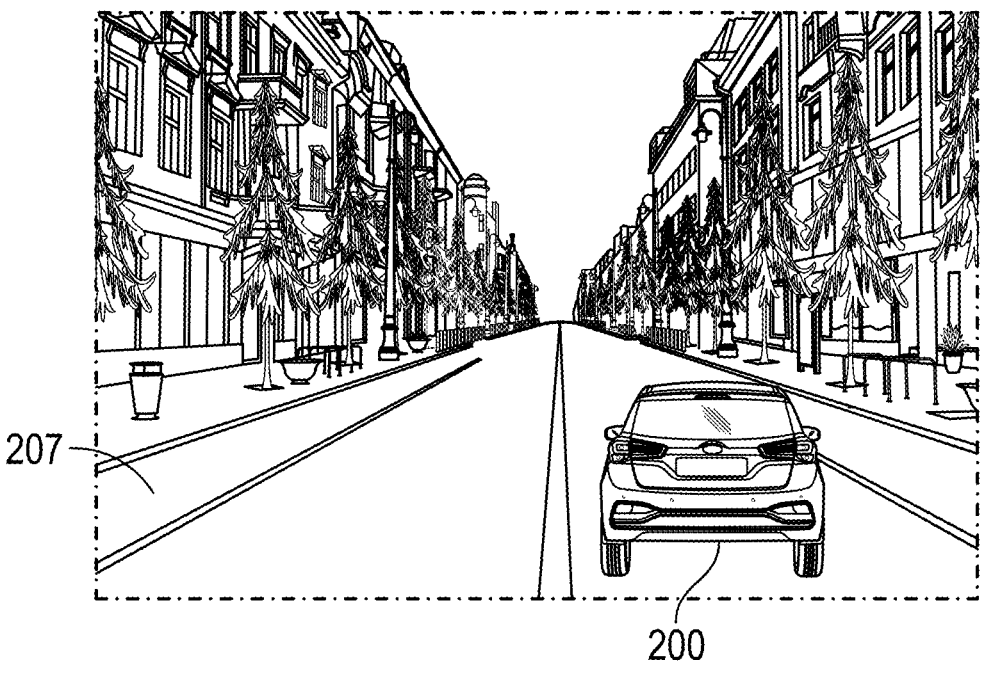

In order to prevent potential unauthorized towing the vehicle 200 may be programmed to perform certain actions to gather evidence that may be useful in the event that the vehicle 200 is towed without proper authorization and/or in a fraudulent manner. FIGS. 3A and 3B illustrate two scenarios according to an embodiment of the present disclosure. As illustrated in FIG. 3A, a vehicle, (e.g., vehicle 200, may be travelling along a road 201). As the vehicle 200 is travelling along the road 201, the various sensors of the vehicle collect audio, visual and other data about the environment in the vicinity of the vehicle. This data may be stored in a rolling buffer. For example, the rolling buffer may store 1 min worth of data and new data is continually overwritten by new data until some trigger condition is satisfied. In our example, consider that the user of the vehicle 200 intends to park the vehicle 200 along the road 201. In order to park the vehicle 200, the user will slow the speed of the vehicle 200, (e.g., between 5 and 10 mph), and eventually the speed of the vehicle will be 0 mph and the parking brake may be engaged once the vehicle 200 is parked. In one embodiment, when the speed of the vehicle is between 5 and 10 mph for a threshold amount of time, the vehicle 200 can infer that the vehicle 200 is likely to be parked imminently. This can act as a trigger event for the vehicle 200 to transfer the data present in the rolling buffer to a more long term storage device, (e.g., memory 204, of the vehicle. This data may be used in the future if documentary evidence is needed for any purpose).

In one embodiment, the data stored in this rolling buffer may be video and/or still images of the environment in the vicinity of the vehicle 200. As illustrated in FIG. 3A, there may road/traffic signs 203 and 205 along the road 201. These road signs 203 and 205 may include information related to parking along the road 201. For example, road sign 203 indicates that parking along that side of the road is limited to two hours and any vehicle parked beyond that time may be towed. Road sign 205 indicates that parking on that side of the road 201 is by permit only and anyone not displaying the appropriate parking permit may be towed. In contrast, the road 207 illustrated in FIG. 3B does not have any road signs. Hence it can be assumed that there are no parking restrictions along the road 207. As the vehicle 200 is travelling along the road 201 or the road 207, it may capture visual data of the structures and road signs that may be present along the road. This visual data is first stored in rolling buffer and if the trigger condition is satisfied, the data may be transferred from the rolling buffer to a long-term storage. In a predatory towing incident, the vehicle 200 that is parked along the road 207 may be towed even if there are no parking restrictions along the road 207. In other situations, the vehicle 200 may be towed from the road 201 before the 2-hr limit for the parking has expired. In such instances, having evidentiary proof that the towing was done illegally will go a long way in preventing such practices.

In some instances, the road signs 203 and 205 may be illegal, fake, or fraudulently installed. Normally it is difficult to determine whether a particular road sign is legitimate or fraudulent. In some embodiments, a road sign that is legally installed by the proper governmental authority are geo-tagged and also may have specific markings such as an identification number or a tracking number embedded into the sign. A database of such geo-tagged road signs may be maintained by the appropriate authority. A fake road sign may not have one or more of these features. In an embodiment, when the vehicle detects presence of a road sign, it may capture an image of the road sign and compare that road sign to the information in the database of the geo-tagged road signs to determine whether the detected road sign is legitimate. If the vehicle detects a mismatch between the location of the detected sign and the information in the database, the vehicle may conclude that the detected road sign is fake and it may send a message to the appropriate authority notifying them of the location of the fake road sign and an image of the fake road sign. The presence of a fake road sign may also alert the vehicle that the chances of predatory towing at that location are high. The vehicle may then inform the user of the vehicle that it would be better to park at another location and suggest one or more alternative locations to park the vehicle 200. In the instance where the vehicle is unable to properly or adequately capture the environment data, (e.g., due to obstruction or lighting conditions, the vehicle may request that the user capture certain aspects of the environment), (e.g., via the user device). The user may then capture additional environment data and provide that data to the vehicle. The vehicle then augments the environment data that it captured with the data received from the user device.

Figure 4:
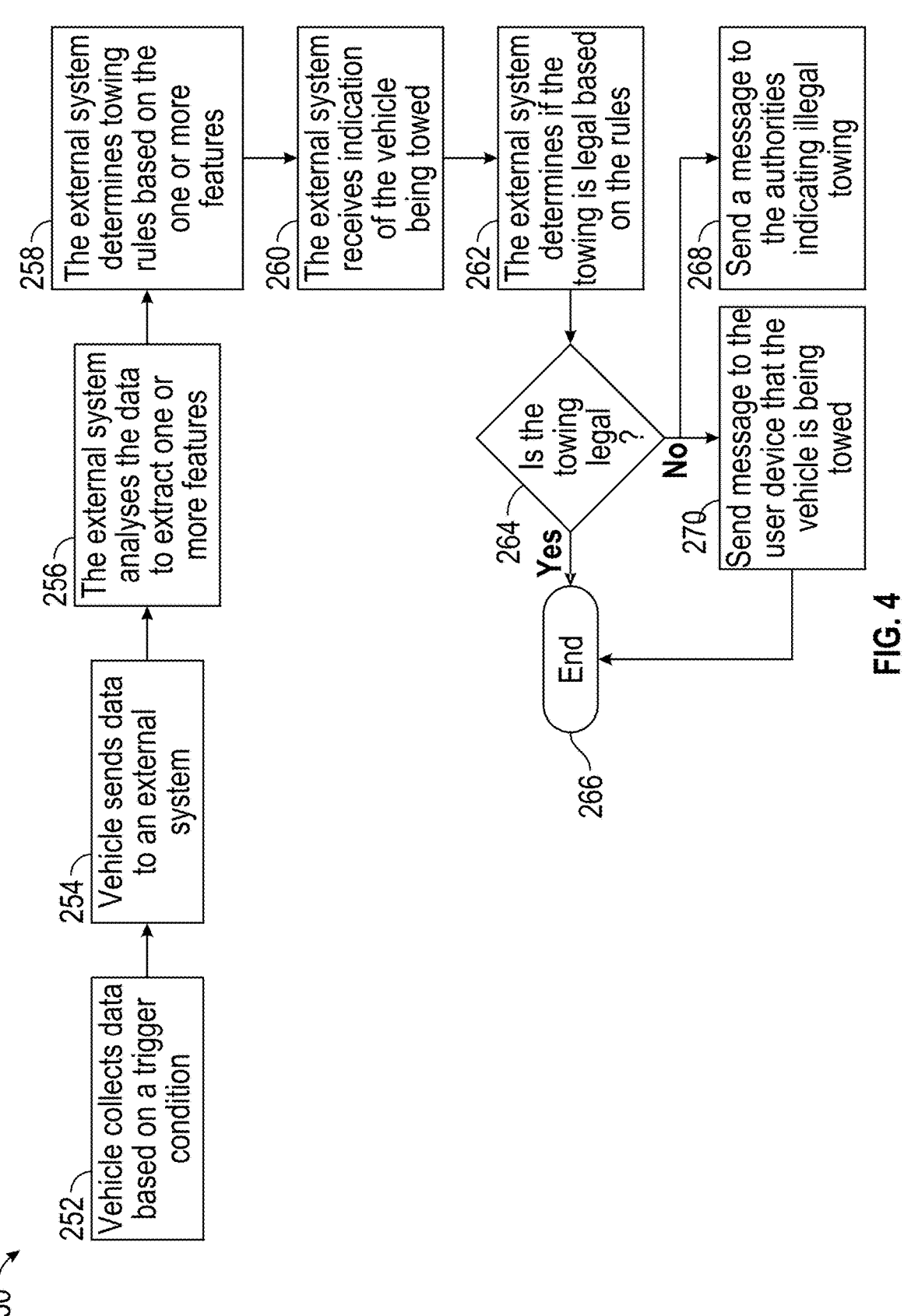
FIG. 4 is a flow chart of a process for determining illegal towing according to an embodiment of the present disclosure.

FIG. 4 illustrates a process 250 for identifying and reporting illegal towing according to an embodiment of the present disclosure. Process 250 may be performed, (e.g., by the control server 500 and/or the vehicle 200, of FIG. 1).

At step 252, the vehicle may capture the environment data in its vicinity as it is travelling along a road. The captured data may be audio, visual, proximity, or other types to data that provides information about the environment. This data may be time stamped and geo-tagged to establish the time the data was captured and the location information of the vehicle when the data was captured. The vehicle may analyze the capture data and check if a trigger condition is satisfied. For example, a trigger condition may include, the vehicle travelling within a certain speed range, the parking brake of the vehicle being engaged, or the like. If the vehicle determines that the trigger condition satisfied, the vehicle may send the captured environment data to an external server (step 254) or transfer the captured environment data to its long term storage. The external server may analyze the environment data and extract one or more features from the data at step 256. For example, if the captured data includes road signage data, the external server may analyze the road signage data to determine if there are any parking restrictions along the road or whether a vehicle is subject to towing under certain conditions, etc. Based on the analysis of the environment data, the external server may determine a set of rules for that location (step 258). In one embodiment, these rules may be related to the towing/parking of vehicles at that location. The external server may send those set of rules to the vehicle. In some embodiments, in addition to the set of rules, the external server may also determine information about local laws related to parking and towing of vehicles, (e.g., using the vehicle code for that jurisdiction, and send information about those laws to the vehicle and/or the user device of the user operating the vehicle).

At step 260, the external server may receive information from the vehicle that the vehicle is being towed. The vehicle may use one or more of its sensors, (e.g., cameras or tilt sensors), to determine whether it is being towed. Based on receiving the information that the vehicle is being towed, the external server may consult the set of rules for the location, determined at step 258, to determine whether the towing is legal or illegal (step 262). If at step 264 it is determined that the towing is legal, the external server may send a message to the user device (step 270), (e.g., indicating that the vehicle is being towed, and the process ends at step 266). If at step 264, it is determined that the towing is illegal, based on the set of rules, in addition to sending a message to the user device, the external server may also send a message to the local law enforcement authorities, (e.g., authorities' server 600 of FIG. 1), that an illegal towing activity is in progress along with the location information of the vehicle (step 268) and other pertinent information. In some embodiments, the vehicle may output audio and/or visual notification indicating that the towing is illegal.

Figure 5:
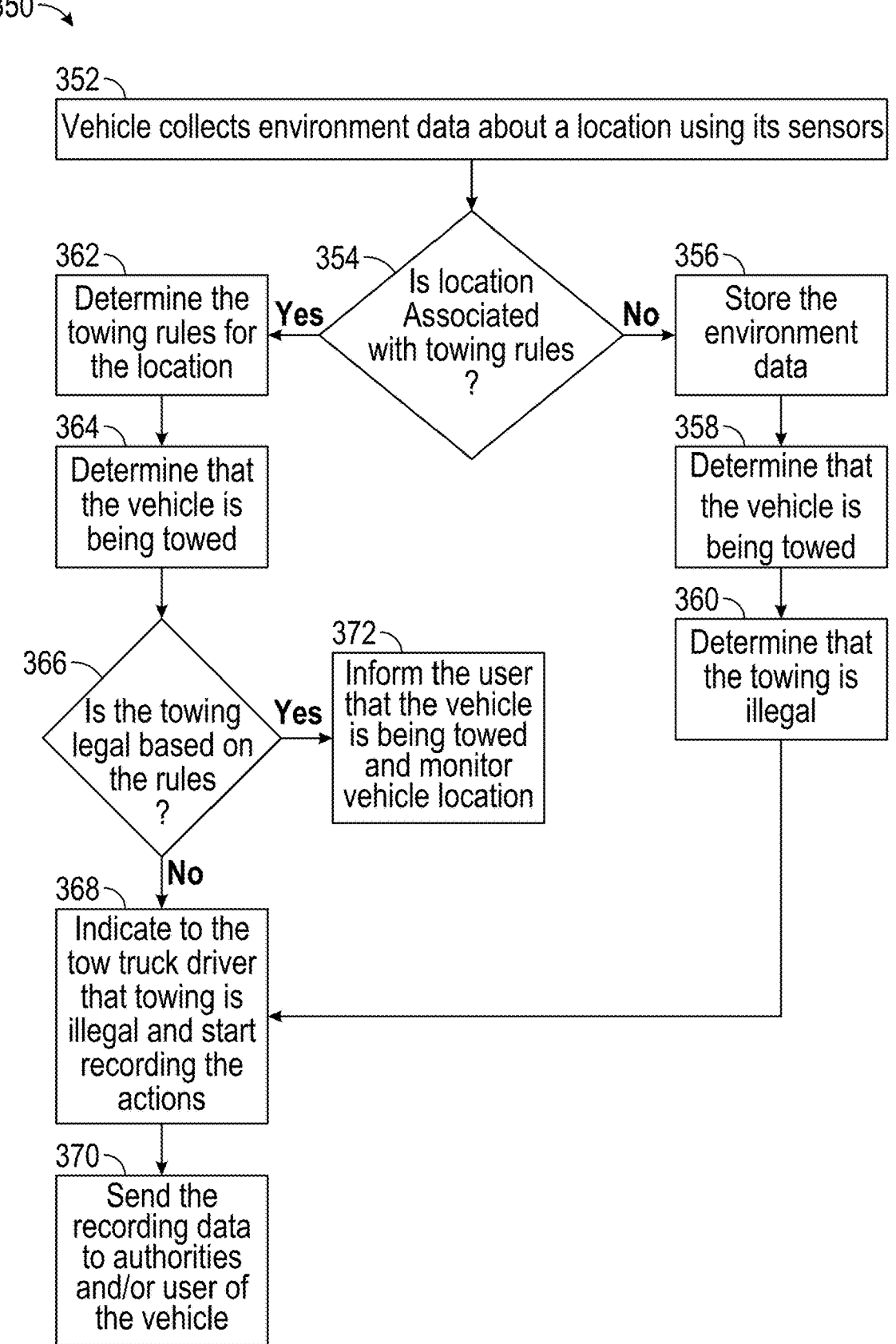
FIG. 5 is a flow chart of a process performed by a vehicle according to an embodiment of the present disclosure.

FIG. 5 illustrates a process 350 for identifying and documenting illegal towing of a vehicle according to an embodiment of the present disclosure. Process 350 may be performed, for example, by the vehicle 200 of FIG. 1. The vehicle may gather environment data as it is travelling along a road, using one or more of its sensors (step 352). This environment data may include audio, visual, proximity, and other data that provide information about the environment in the vicinity of the vehicle. In an embodiment, the environment data may include information about any signs or information posted along the road. Such information may include details about any parking restrictions, towing information, or other alerts associated with the road. The environment data is continually gathered and stored in the vehicle, (e.g., in a rolling buffer. If the vehicle detects a trigger event), (e.g., slowing a speed within a certain range, stopping completely, detecting engagement of the parking brake, etc.), that indicates that the vehicle may be parked or will be imminently parked, it may transfer the data from the rolling buffer to a long-term storage in the vehicle. At step 354, the vehicle may analyze the environment data to determine whether the location where the vehicle is parked has any towing rules associated with it, e.g., as illustrated in FIGS. 3A and 3B above. If it is determined that there are no towing/parking rules associated with the location, the vehicle may store the environment data in the long-term storage of the vehicle (step 356) as evidence that the vehicle was not subject to towing at that location. This environment data is time-stamped and geo-tagged and may be used as evidence in any legal proceedings, if needed.

In an embodiment, the vehicle may detect that it is being towed (step 358). The vehicle may use one or more of its external and internal sensors to determine that it is being towed or lifted. There are many known techniques in the art to determine whether the vehicle is being towed. Examples includes systems that use accelerometers to detect the tilt of a vehicle, movement of a vehicle when the ignition is off, etc. If the vehicle detects that it is being towed, it can then determine whether the towing is authorized or unauthorized. Since at step 354 the vehicle has determined that the vehicle is not subject to towing at the location, the vehicle determines at step 360 that the towing is unauthorized or illegal. Based on the determination that the towing is illegal, the vehicle may indicate to the tow vehicle operator that his/her actions are illegal, (e.g., via one or more speakers of the vehicle (step 368)). For example, the vehicle may output audio via its speakers indicating to the tow vehicle operator that the towing is illegal since this location is not subject to any towing rules. In addition, the vehicle may also output audio telling the tow vehicle operator that the towing incident is being recorded and will be provided as proof of the illegal activity. Upon determination that the towing is illegal, the vehicle may start recording the actions of the tow vehicle operator and also capture the information of the tow vehicle, such as license plate number. In an embodiment, the vehicle may send the recorded information to the local law enforcement authorities and/or to the user device of the user of the vehicle (step 370). In another embodiment, the recorded information may be sent to the control server 500 for long-term storage.

If at step 354, it is determined that the location is associated with towing/parking, based on the analysis of the environment data captured at step 352, the vehicle may determine one or more towing/parking rules associated with the location at step 362. The towing rules may be time-based, permit-based, or the like. The vehicle may store the one or more towing rules associated with the location in its memory or optionally send this information to an external server. At step 364, the vehicle may detect that it is being towed. This step may be similar to step 358 described above. Once the vehicle determines that it is being towed, the vehicle may then determine whether the towing is legal or illegal at step 366. The vehicle may consult the one or more towing rules determined at step 362 and based on those rules determine whether the towing is legal or illegal. For example, consider that the towing rules indicate that after 2 hours of parking, the vehicle may be subject to towing. In this instance, the vehicle may determine the amount of time elapsed from when the vehicle was parked at the location to the current time. If the amount of time elapsed is less than 2 hours, the vehicle may determine that the towing is illegal. If at step 366, the vehicle determines that the towing is illegal, it may output an indication, e.g., in an audio and/or visual form, that the towing is illegal and start recording the actions of the tow vehicle operator (step 368). Additionally or optionally, the vehicle may also send a message to the local law enforcement authority and/or the user of the vehicle that the vehicle is being illegally towed (step 370).

FIG. 6 illustrates a process 450 of preventing towing of a vehicle according to an embodiment of the present disclosure. Process 450 may be performed, (e.g., by the vehicle 200 of FIG. 1). At step 452, the vehicle may collect environment data associated with a current location of the vehicle. In an embodiment, this environment data may be collected based on satisfying a trigger condition as explained above. In other embodiments, the environment data may be continually collected and only a specific portion of the environment data that is related to the location where the vehicle is parked or intended to be parked is saved. In either case, at the time that the vehicle is parked, the vehicle has the environment data about the location and its vicinity where the vehicle is parked. At step 454, the vehicle determines that the location where the vehicle is parked is subject to towing based on one or more rules associated with the towing. For example, there may be a two hour parking limit at the location, a permit may be required to park at the location, etc. Based on the determination that the current location at which the vehicle is parked or about to be parked is subject to towing/parking restrictions, the vehicle may suggest one or more alternative parking locations that are not subject to towing/parking restrictions, at step 456. For example, the vehicle may determine that there is a paid parking garage near to the location and indicate to the user of the vehicle, (e.g., via the infotainment system 238), that it may be better to park at the parking garage to avoid potential towing of the vehicle.

In some embodiments, the user of the vehicle may ignore the suggestion by the vehicle to park at an alternate parking location and park the vehicle at the current location. At step 458, the vehicle may determine that it is parked at the current location that is subject to towing/parking restrictions under certain conditions or rules. After the vehicle is parked at the location, the vehicle may determine presence of a tow vehicle in the vicinity of the vehicle (step 460). For example, the vehicle may use its integrated security system and associated sensors to continually monitor the vehicle surroundings. Based on the data captured by its sensors, the vehicle can determine presence of other vehicles in its vicinity, including a tow vehicle. If the vehicle detects presence of a tow vehicle in its vicinity, the vehicle may determine whether the vehicle is in violation of any of the towing/parking related rules associated with that location. For example, if the towing related rule indicates that vehicles parked at that location are subject to towing after 2 hours, the vehicle may compare the current time with the time it was parked at the location to determine if 2 hours have elapsed. If the vehicle determines that 2 hours have not elapsed, the vehicle may conclude that it is not subject to towing. The vehicle may determine at step 462 that the vehicle has not violated any rules associated with towing for that location.

In this instance, however, due to the presence of the tow vehicle, the vehicle may anticipate predatory towing and send a message to the user device of the user of the vehicle indicating presence of the tow truck at the location where the vehicle is parked (step 464). The user upon receiving the message may choose to return to the vehicle and move the vehicle to a different parking location to avoid the potential predatory towing. In some instances, the vehicle may wait until the tow vehicle is within a threshold distance of the vehicle before sending the message to the user device. In other instances, the vehicle may send the message to the user device upon first detecting presence of the tow vehicle regardless of its distance from the tow vehicle, to allow the user sufficient time to get back to the vehicle. In some instances, after sending the message to the user device or even before sending the message, the vehicle may detect that it is being towed (step 466). Since the vehicle has previously determined, at step 462, that it does not violate any of the towing related rules for that location, the vehicle may conclude that the towing is illegal and may send a message to the local law enforcement agency notifying them of the illegal towing activity and giving them the location of the towing activity and details of the tow vehicle and/or the towing vehicle operator/owner (step 468). In addition, the vehicle may also send a message to the user device notifying the user that the vehicle is being towed. It may be possible for the user to immediately return to the location and retrieve the vehicle.

In one instance, when a user parks the vehicle at the location that has one or more towing/parking related rules/restrictions associated with it (step 458), the vehicle determines those one or more rules, (e.g., based on analyzing the environment data captured by the vehicle prior to the parking). Consider that there is a time-based restriction for parking at the location, such as the vehicle is subject to towing after 2 hours. In this instance, the vehicle determines a first time when the vehicle was parked at the location and then determines a second time after which the vehicle may be subject to towing, i.e., two hours from the first time (step 470). The vehicle then continually monitors the current time and compares that to the second time to determine how much time is left before the vehicle is subject to towing. The vehicle may determine that the current time is within a threshold time of the second time (step 472). Based on that determination, the vehicle may send a message to the user device indicating that the vehicle is subject to towing after the second time and suggesting that the vehicle be moved prior to the second time (step 474). In some instances, the vehicle may determine the location of the user device and determine a distance between the vehicle and the user based on the location of the user device. The device may then calculate an approximate time that the user may need to reach the vehicle. The threshold time may be dynamically adjusted based on the calculated approximate time. For example, consider that the location of the user device indicates that the user is 200 meters away from the vehicle. Based on this information, the vehicle may determine that it will take the user 10 mins to reach the vehicle. The vehicle may then adjust the threshold to be 15 mins prior to the second time, such that when the current time is 15 mins less than the second time, the vehicle may send the message to the user device in step 474. As the distance between the user and the vehicle increases, the threshold may also be increased. The vehicle may continually monitor the location of the user device and adjust the threshold accordingly.

In some embodiments, before notifying the local law enforcement authorities about the illegal towing event, the vehicle may request a confirmation from the user of the vehicle, via the user device, that the vehicle may notify the local enforcement authorities. Once the local law enforcement authorities arrive at the location, the vehicle may send the captured evidence of the illegal towing to the authorities in real-time so that the authorities can provide the evidence to the towing operator.

In some instances, when the vehicle is being towed, the vehicle may monitor the tow operator actions to determine that the towing is being done in a proper manner. The vehicle may record any damage done by the tow operator due to incorrect towing process or negligence of the tow operator and provide that information to the owner or the law enforcement authority. Examples of incorrect towing include but are not limited to flat towing an electric vehicle beyond a certain distance or above a certain speed, incorrectly towing a car based on powertrain architecture or driven wheels, improper securing of the vehicle for transportation resulting in damage to the vehicle, scrapping the vehicle on the ground when being lifted up, etc. In the instance where the vehicle determines that the towing is illegal, it may lodge a complaint directly with the local law enforcement, (e.g., by sending a message to the authorities' server 600).

In some embodiments, the vehicle may request the tow operator to provide the proper documentation both in the case of legal towing or illegal towing. The tow operator may provide these documents directly to the insurance company. In other embodiments, the vehicle may record some of the information related to the tow event and provide that information to the insurance company so that the insurance company may verify that against the information provided by the tow operator to ensure authenticity of the information. For example, the vehicle may record the arrival and departure times of the tow vehicle, license plate number of the tow vehicle, the equipment used for towing, whether other personnel participated in the towing (e.g., fire department, utility workers, etc.), the location information of the place where the vehicle was towed to, whether the tow operator complied with the maximum distance restriction for towing the vehicle, etc. The vehicle 200 and/or the control server 500 may also compare the charges assessed by the tow company to standard or historical charges for that location to determine whether the charges are reasonable or exorbitant.

Figure 7:
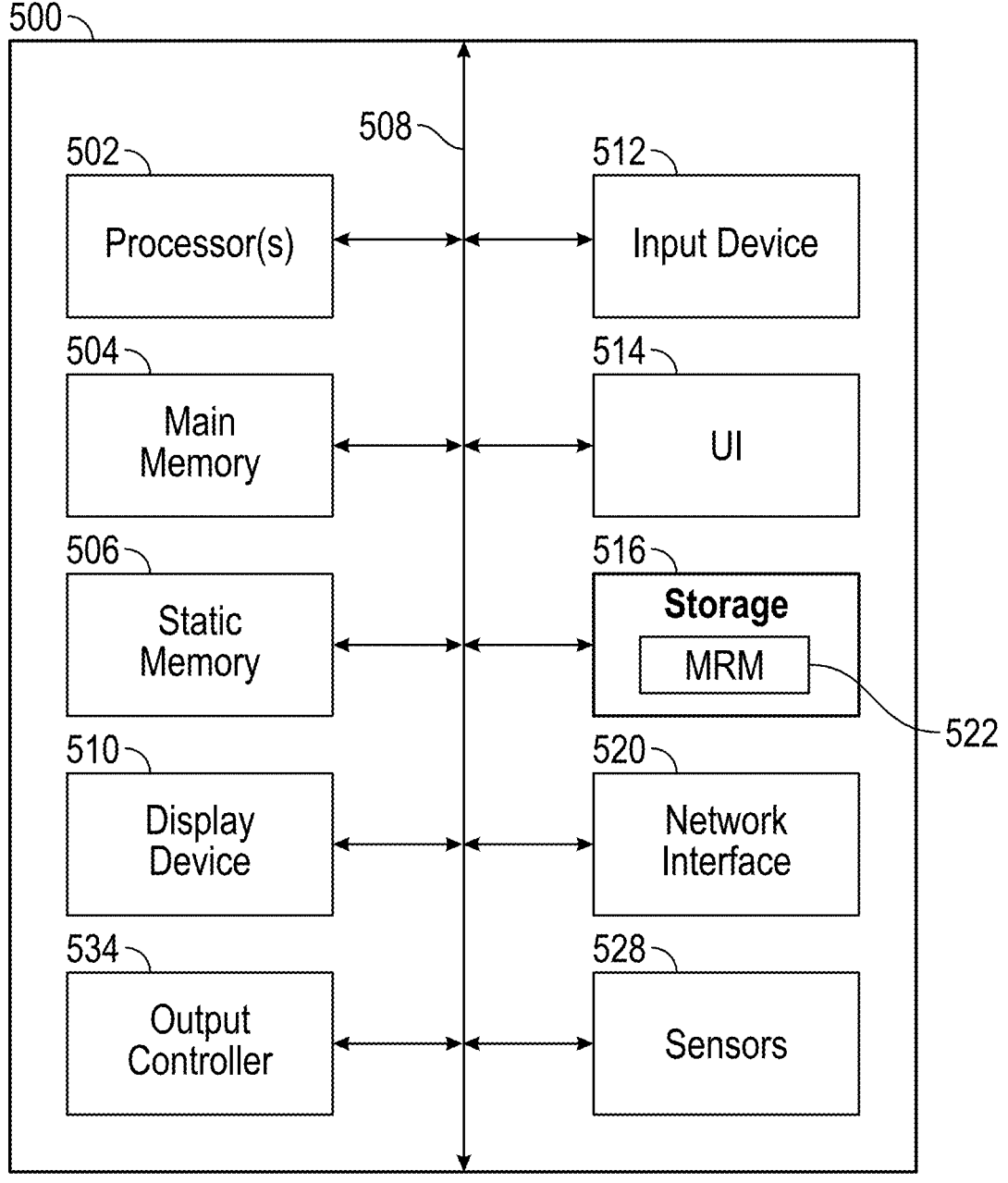
FIG. 7 is a functional block diagram of a server according to an embodiment of the present disclosure.

FIG. 7 depicts a block diagram of an example control server 500 upon which any of one or more techniques (e.g., methods) may be performed, in accordance with one or more example embodiments of the present disclosure. In other embodiments, the server 500 may operate as a standalone device or may be connected (e.g., networked) to other servers. In a networked deployment, the server 500 may operate in the capacity of a server machine, a client machine, or both in server-client network environments. In an example, the server 500 may act as a peer server in peer-to-peer (P2P) (or other distributed) network environments. The server 500 may be a personal computer (PC), a tablet PC, a set-top box (STB), a personal digital assistant (PDA), a mobile telephone, a smart key fob, a wearable computer device, a web appliance, a network router, a switch or bridge, or any machine capable of executing instructions (sequential or otherwise) that specify actions to be taken by that server, such as a base station. Further, while only a single server is illustrated, the term "server" shall also be taken to include any collection of servers that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific task when in operation. The configuring may occur under the direction of the execution units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The server (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The server 500 may further include a graphics display device 510, an alphanumeric input device 512 (e.g., a keyboard), and a user interface (UI) navigation device 514 (e.g., a mouse). In an example, the graphics display device 510, alphanumeric input device 512, and UI navigation device 514 may be a touch screen display. The server 500 may additionally include a storage device (i.e., drive unit) 516, a network interface device/transceiver 520 coupled to antenna(s), and one or more sensors 528, such as a global positioning system (GPS) sensor, a compass, an accelerometer, or other sensor. The server 500 may include an output controller 534, such as a serial (e.g., universal serial bus (USB)), parallel, or other wired or wireless (e.g., infrared (IR)), near field communication (NFC), etc. connection to communicate with or control one or more peripheral devices (e.g., a printer, a card reader, etc.).

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within the static memory 506, or within the hardware processor 502 during execution thereof by the server 500. In an example, one or any combination of the hardware processor 502, the main memory 504, the static memory 506, or the storage device 516 may constitute machine-readable media.

While the machine-readable medium 522 is illustrated as a single medium, the term "machine-readable medium" may include a single medium or multiple media (e.g., a centralized or distributed database, and/or associated caches and servers) configured to store the one or more instructions 524.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the server 500 and that cause the server 500 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device/transceiver 520 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 520 may include one or more physical jacks (e.g., Ethernet, coaxial, or phone jacks) or one or more antennas to connect to the communications network 526. In an example, the network interface device/transceiver 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the server 500 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

It is to be noted that the vehicle implements and/or performs operations, as described here in the present disclosure, in accordance with the owner manual and safety guidelines. In addition, any action taken by the vehicle owner based on recommendations or notifications provided by the vehicle should comply with all the rules specific to the location and operation of the vehicle (e.g., Federal, state, country, city, etc.). The recommendation or notifications, as provided by the vehicle, should be treated as suggestions and only followed according to any rules specific to the location and operation of the vehicle. In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A vehicle comprising:
one or more processors;
one or more sensors coupled to the one or more processors; and
a memory coupled to the one or more processors;
wherein the memory stores instructions that when executed by the one or processors, cause the one or more processors to:
capture, using the one or more sensors, environment data associated with an environment in a vicinity of the vehicle;
determine a first location of the vehicle within the environment;
determine, based on the environment data, that the first location is associated with one or more parking rules;
determine that the vehicle is being towed;
determine, based on the one or more parking rules, that the towing of the vehicle is not authorized;
capture, using the one or more sensors, towing data associated with the towing of the vehicle, the towing data comprising image data of a tow vehicle or an operator of the tow vehicle;
output a notification indicating that the towing of the vehicle is not authorized; and
send the towing data to a user device associated with a user of the vehicle.

2. The vehicle of claim 1, wherein the instructions further cause the one or more processors to send the environment data to an external server, wherein the external server is associated with a law enforcement agency.

3. The vehicle of claim 1, wherein the instructions further cause the one or more processors to:
determine occurrence of a trigger event.

4. The vehicle of claim 3, wherein the trigger event is one of: the vehicle travelling within a first speed range, a parking brake of the vehicle being engaged, or a speed of the vehicle being 0 mph.

5. The vehicle of claim 1, wherein the instructions further cause the one or more processors to:

determine, based on the first location being associated with the one or more parking rules, a second location, wherein the second location is not associated with the one or more parking rules; and output information about the second location.

6. The vehicle of claim 1, wherein the instructions further cause the one or more processors to:

send the towing data to an external server associated with a law enforcement agency.

7. The vehicle of claim 1, wherein the environment data includes information about one or more road signs present in the vicinity of the vehicle.

8. The vehicle of claim 7, wherein to determine that the first location is associated with one or more parking rules, the instructions further cause the one or more processors to:

analyze the one or more road signs to determine the one more parking rules;

determine parking rules associated with the first location based on historical data about the first location; and determine, based on the historical data, whether the one or more rules are valid.

9. A method comprising:

capturing, by a vehicle using a plurality of integrated sensors at a first time, first data associated with a first location of the vehicle;

determining, by the vehicle and based on the first data, that the first location is associated with one or more parking rules;

determining, by the vehicle at a second time, that the vehicle is being towed;

determining, by the vehicle and based on the one or more parking rules, that the towing is unauthorized;

capturing, by the vehicle using one or more of the integrated sensors, second data associated with the towing of the vehicle, the second data comprising image data of a tow vehicle or an operator of the tow vehicle;

outputting, by the vehicle, a notification indicative of the towing being unauthorized; and sending, by the vehicle, the second data to a user device of a user of the vehicle.

10. The method of claim 9, further comprising:

detecting, by the vehicle, a trigger event, wherein the trigger event is one of: the vehicle travelling within a first speed range, a parking brake of the vehicle being active, or the vehicle having a speed of 0 mph.

11. The method of claim 9, further comprising:

determining, by the vehicle, a second location, wherein the second location is not associated with the one or more parking rules; and outputting, by the vehicle, information about the second location via one of: a display of the vehicle or the user device.

12. The method of claim 9, further comprising:

determining parking rules associated with the first location based on historical data about the first location; and determining, based on the historical data, whether the one or more parking rules are valid.

13. The method of claim 9, wherein outputting the notification includes outputting an audible message via one or more speakers of the vehicle, the audible message indicating that the towing is illegal and data related to the towing is being captured by the vehicle.

14. The method of claim 9, wherein determining that the first location is associated with the one or more parking rules further comprising analyzing, by the vehicle, the first data, wherein the first data includes visual information about one or more road signs present at the first location.

15. A vehicle comprising:

a plurality of sensors;

one or more processors coupled to the plurality of sensors;

one or more memories coupled to the one or more processors, wherein the one or more processors is configured to:

capture, at a first time, first data associated with a first location of the vehicle, wherein the first data includes information about one or more road signs at the first location;

determine, based on the first data, that the first location is associated with one or more parking rules;

determine that the vehicle is parked at the first location;

determine, at a second time, presence of a tow vehicle in a vicinity of the first location;

send a first message to a user device associated with a user of the vehicle, the first message indicating presence of the tow vehicle;

determine, based on the first data at the second time, that the vehicle will be in violation of the one or more parking rules at a third time;

determine, at the second time, a distance between the vehicle and the user device;

determine, based on the distance, an amount of time needed for the user to return to the first location;

send, based on the amount of time and a difference between the second time and the third time, a second message to the user device instructing the user to return to the first location.

16. The vehicle of claim 15, wherein the one or more processors is further configured to:

determine a second location, wherein the second location is not associated with the one or more parking rules; and output information about the second location via one of: a display of the vehicle or the user device.

17. The vehicle of claim 15, wherein the one or more processors is further configured to:

determine, at the second time, that the vehicle is not in violation of the one or more parking rules:

determine that the vehicle is being towed by the tow vehicle; and output a notification indicating that a towing is unauthorized or illegal.

18. The vehicle of claim 17, wherein the one or more processors is further configured to:

capture second data associated with the towing of the vehicle; and send the first data and the second data to an external device.

19. The vehicle of claim 15, wherein the second data comprises image data of the tow vehicle or an operator of the tow vehicle.

20. The vehicle of claim 15, wherein prior to sending the first message, the one or more processors is further configured to determine that the tow vehicle is within a threshold distance of the vehicle.

\* \* \* \* \*